(12) United States Patent
Fukada

(10) Patent No.: US 12,077,144 B1
(45) Date of Patent: Sep. 3, 2024

(54) CONTROL DEVICE AND CONTROL METHOD FOR CONTROLLING VEHICLE CAPABLE OF SWITCHING BETWEEN TWO-WHEEL DRIVE AND FOUR-WHEEL DRIVE

(71) Applicant: TOYOTA JIDOSHA KABUSHIKI KAISHA, Toyota (JP)

(72) Inventor: Shunro Fukada, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/405,387

(22) Filed: Jan. 5, 2024

(30) Foreign Application Priority Data

Mar. 31, 2023 (JP) ................. 2023-057121

(51) Int. Cl.
| | | |
|---|---|---|
| *B60W 10/119* | (2012.01) | |
| *B60W 10/20* | (2006.01) | |
| *B60W 40/068* | (2012.01) | |
| *B60W 40/101* | (2012.01) | |
| *B60W 50/08* | (2020.01) | |

(52) U.S. Cl.
CPC .......... *B60W 10/119* (2013.01); *B60W 10/20* (2013.01); *B60W 40/068* (2013.01); *B60W 40/101* (2013.01); *B60W 50/082* (2013.01); *B60W 2420/403* (2013.01); *B60W 2756/10* (2020.02)

(58) Field of Classification Search
CPC .. B60W 10/119; B60W 10/20; B60W 40/068; B60W 40/101; B60W 2756/10; B60W 50/082; B60W 2420/403; B60W 2520/26–266; B60W 2300/18; B60W 2552/40
See application file for complete search history.

(56) References Cited

U.S. PATENT DOCUMENTS

2015/0203117 A1*  7/2015  Kelly ................... B60W 40/06
                                                            701/91
2019/0367003 A1* 12/2019  Okada ................... B60T 8/1755

FOREIGN PATENT DOCUMENTS

| JP | 2020-082896 A | 6/2020 |
|---|---|---|
| JP | 2020-090174 A | 6/2020 |

* cited by examiner

Primary Examiner — Timothy Hannon
(74) Attorney, Agent, or Firm — Oliff PLC

(57) ABSTRACT

A control device for a vehicle is provided with a region setting unit and a switching execution unit. The region setting unit is configured to set a drive region including a two-wheel drive region in which two-wheel drive is executed and a four-wheel drive region in which four-wheel drive is executed according to a driving state parameter. The switching execution unit is configured to switch between the two-wheel drive and the four-wheel drive according to a switching condition set in advance while the vehicle is traveling in the two-wheel drive region. The region setting unit is configured to expand the two-wheel drive region during autonomous driving compared to manual driving.

10 Claims, 12 Drawing Sheets

CONTROL DEVICE AND CONTROL METHOD FOR CONTROLLING VEHICLE CAPABLE OF SWITCHING BETWEEN TWO-WHEEL DRIVE AND FOUR-WHEEL DRIVE

CROSS-REFERENCE TO RELATED APPLICATION

This application claims priority to Japanese Patent Application No. 2023-057121 filed on Mar. 31, 2023, incorporated herein by reference in its entirety.

BACKGROUND

1. Technical Field

The present disclosure relates to a control device and a control method that controls a vehicle designed for switching between two-wheel drive and four-wheel drive.

2. Description of Related Art

Travel control that switches between two-wheel drive and four-wheel drive in consideration of the traveling state of a vehicle has been known. For example, Japanese Unexamined Patent Application Publication No. 2020-082896 proposes a technology for switching between two-wheel drive and four-wheel drive in a vehicle that executes autonomous driving control, taking into account a travel plan of the vehicle.

SUMMARY

Generally, four-wheel drive has lower fuel efficiency than two-wheel drive, but has superior traction performance. Therefore, there has been a desire to further improve the balance between fuel efficiency and traction performance.

A first aspect of the present disclosure relates to a control device configured to control a vehicle that designed for autonomous driving and can switch between two-wheel drive and four-wheel drive. The control device includes a region setting unit and a switching execution unit. The region setting unit is configured to set a drive region including a two-wheel drive region in which the two-wheel drive is executed and a four-wheel drive region in which the four-wheel drive is executed according to a driving state parameter. The switching execution unit is configured to switch between the two-wheel drive and the four-wheel drive according to a switching condition set in advance while the vehicle is traveling in the two-wheel drive region. The region setting unit is configured to expand the two-wheel drive during autonomous driving compared to manual driving.

According to the control device of the first aspect of the present disclosure, since the two-wheel drive region is expanded during autonomous driving, traction performance by four-wheel drive can be ensured while suppressing deterioration in fuel efficiency.

The control device according to the first aspect may further include a slip ratio calculation unit configured to calculate a slip ratio of a wheel of the vehicle. The switching execution unit may be configured to switch from the two-wheel drive to the four-wheel drive when the slip ratio becomes equal to or greater than a slip ratio threshold set in advance during execution of the two-wheel drive during autonomous driving. The slip ratio calculation unit may calculate a slip ratio Sr of the wheel from a vehicle speed Vv and a wheel speed Vw of each wheel of the vehicle using an equation $Sr = \max |Vv - Vw|/Vv$. Here, max means a calculation that takes the maximum value of the slip ratio for each wheel.

According to the control device configured as described above, traction performance can be maintained by switching to four-wheel drive when slip occurs in the wheel.

The control device configured as described above may further include a friction coefficient estimation unit configured to estimate a friction coefficient between a traveling road of the vehicle and the wheel. The switching execution unit may be configured to switch from the two-wheel drive to the four-wheel drive regardless of the slip ratio when the friction coefficient becomes less than a friction coefficient threshold set in advance during execution of the two-wheel drive during autonomous driving.

According to the control device configured as described above, when the friction coefficient of the traveling road is small, the occurrence of slip can be suppressed by executing four-wheel drive.

In the control device configured as described above, the friction coefficient estimation unit may be configured to estimate the friction coefficient of the traveling road using one or more pieces of slip ratio information indicating the slip ratio, first road surface information obtained by communication with an external device, and second road surface information obtained from an image taken by a camera mounted on the vehicle.

With the control device configured as described above, it is possible to estimate the friction coefficient of the traveling road from various pieces of information.

A second aspect of the present disclosure relates to a control method that controls a vehicle that designed for autonomous driving and can switch between two-wheel drive and four-wheel drive. This control method includes a first step of setting a drive region including a two-wheel drive region in which the two-wheel drive is executed and a four-wheel drive region in which the four-wheel drive is executed according to a driving state parameter, and a second step of switching between the two-wheel drive and the four-wheel drive according to a switching condition set in advance while the vehicle is traveling in the two-wheel drive region. The first step includes a step of expanding the two-wheel drive region during autonomous driving compared to manual driving.

With the control method of the second aspect of the present disclosure, since the two-wheel drive region is expanded during autonomous driving, traction performance by four-wheel drive can be ensured while suppressing deterioration in fuel efficiency.

The control method according to the second aspect of the present disclosure may further include a third step of calculating a slip ratio of a wheel of the vehicle. The second step may include a step of switching from the two-wheel drive to the four-wheel drive when the slip ratio becomes equal to or greater than a slip ratio threshold set in advance during execution of the two-wheel drive during autonomous driving. In the third step, a slip ratio Sr of the wheel may be calculated from a vehicle speed Vv and a wheel speed Vw of each wheel of the vehicle using an equation $Sr = \max |Vv - Vw|/Vv$. Here, max means a calculation that takes the maximum value of the slip ratio for each wheel.

According to the control method configured as described above, traction performance can be maintained by switching to four-wheel drive when slip occurs in the wheel.

The control method configured as described above may further include a fourth step of estimating a friction coefficient between a traveling road of the vehicle and the wheel. The second step may include a step of switching from the two-wheel drive to the four-wheel drive regardless of the slip ratio when the friction coefficient becomes less than a friction coefficient threshold set in advance during execution of the two-wheel drive during autonomous driving.

With the control method configured as described above, when the friction coefficient of the traveling road is small, the occurrence of slip can be suppressed by executing four-wheel drive.

In the control method configured as described above, the step of estimating the friction coefficient may include a step of estimating the friction coefficient of the traveling road using one or more pieces of slip ratio information indicating the slip ratio, first road surface information obtained by communication with an external device, and second road surface information obtained from an image taken by a camera mounted on the vehicle.

With the control method configured as described above, it is possible to estimate the friction coefficient of the traveling road from various pieces of information.

The present disclosure can also be realized in various forms other than control devices and control methods for vehicles. For example, it can be realized in the form of a computer program that executes control of a vehicle, a non-transitory storage medium on which a computer program is recorded, or the like.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
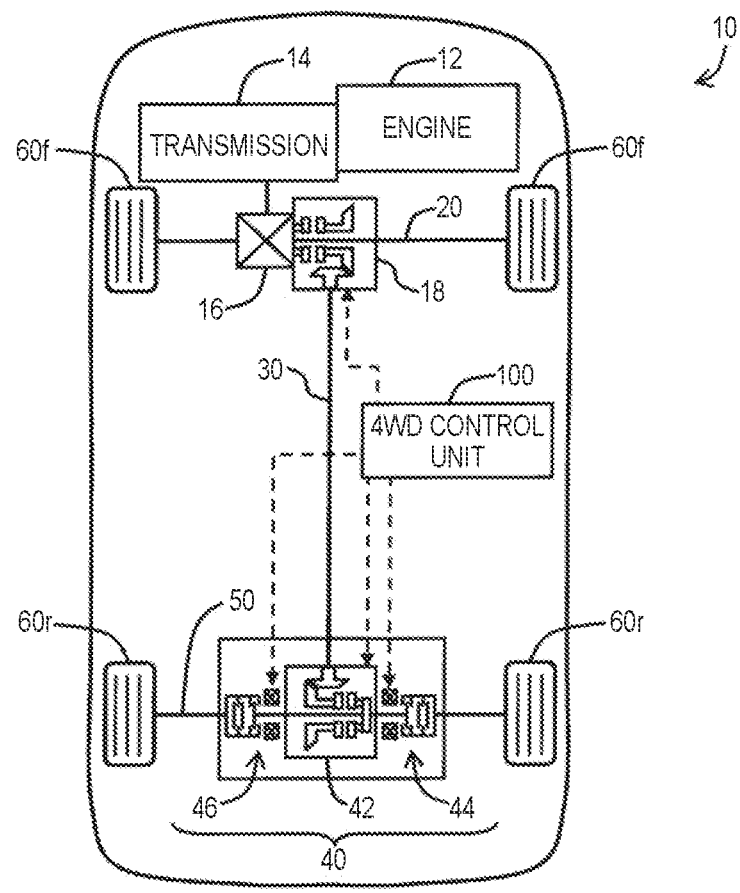
FIG. 1 is an explanatory diagram illustrating a configuration of a four-wheel drive system for a vehicle equipped with a control device of the present disclosure.

A first embodiment of the present disclosure will be described below. FIG. 1 is an explanatory diagram illustrating the configuration of a four-wheel drive system for a vehicle 10. The vehicle 10 includes an engine 12 which is an internal combustion engine, a transmission 14, a first differential device 16, a first disconnect mechanism 18, a front axle 20, a propeller shaft 30, a second differential device 40, a rear axle 50, a front wheel 60f, a rear wheel 60r, and a four-wheel drive control unit 100. The second differential device 40 includes a second disconnect mechanism 42, a first coupling mechanism 44, and a second coupling mechanism 46. The disconnect mechanisms 18, 42 are configured by, for example, dog clutches. Further, the coupling mechanisms 44, 46 are configured, for example, by electronically controlled couplings.

The four-wheel drive control unit 100 can switch between two-wheel drive and four-wheel drive by controlling the disconnect mechanisms 18, 42 and the second differential device 40. When executing two-wheel drive, the two disconnect mechanisms 18, 42 are respectively disconnected. Since the vehicle 10 is a front-wheel drive vehicle, only the front wheels 60f are driven in the two-wheel driving mode. That is, the front wheels 60f are driving wheels and the rear wheels 60r are driven wheels. On the other hand, when executing four-wheel drive, the two disconnect mechanisms 18 and 42 are respectively connected.

During two-wheel drive traveling, the input of the engine 12 is not transmitted to the propeller shaft 30 or the rear axle 50, thus improving fuel efficiency. On the other hand, during four-wheel drive traveling, the traction performance (the ability to move without slipping due to the frictional force of the tires) is excellent. The four-wheel drive control unit 100 can execute torque distribution between the front wheels 60f and the rear wheels 60r by controlling the coupling mechanisms 44, 46. The four-wheel drive control unit 100 is an example of a "control device" of the present disclosure.

Any configuration other than the configuration illustrated in FIG. 1 can be adopted as the four-wheel drive system. For example, a viscous coupling type four-wheel drive system may be used, or a dual pump type four-wheel drive system may be used. Further, an electric four-wheel drive system may be used in which main drive wheels are driven by an engine (internal combustion engine) and slave drive wheels are driven by an electric motor. Also, a system in which the rear wheels 60r are used as driving wheels in two-wheel drive may be used.

Figure 2:
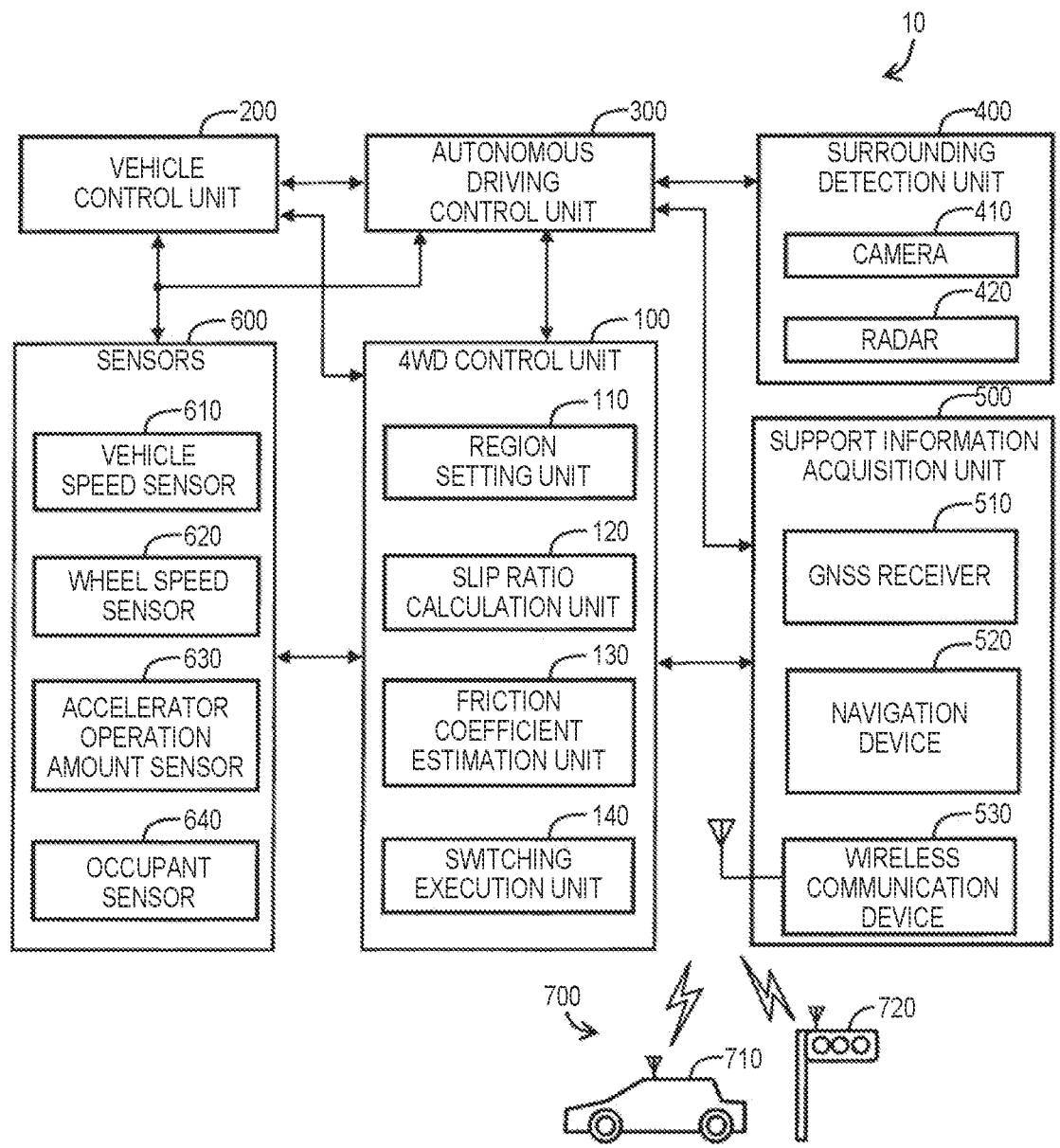
FIG. 2 is a block diagram illustrating a configuration of a control system for the vehicle.

FIG. 2 is a block diagram illustrating the configuration of a control system of the vehicle 10. The vehicle 10 includes a vehicle control unit 200, an autonomous driving control unit 300, a surrounding detection unit 400, a support information acquisition unit 500, and sensors 600 in addition to the four-wheel drive control unit 100 illustrated in FIG. 1. In the present disclosure, the vehicle 10 is also referred to as a "subject vehicle 10". The four-wheel drive control unit 100, the vehicle control unit 200, and the autonomous driving control unit 300 can each be configured using one or more electronic control units (ECUs). The ECU has a processor, a RAM, and a ROM, and the ROM stores a computer program. The functions of the control units 100, 200, 300 can be realized by the processor executing a computer program stored in a nonvolatile storage medium. Part of the functions of these control units 100, 200, 300 may be realized by hardware circuits.

The vehicle control unit 200 executes various controls such as drive control, brake control, and steering angle control for driving the vehicle 10. The vehicle control unit 200 is used for both autonomous driving and manual driving.

The autonomous driving control unit 300 executes autonomous driving using information on a driving state of the vehicle 10 given from the sensors 600 including a vehicle speed sensor 610 and information given from the surrounding detection unit 400 and the support information acquisition unit 500. Specifically, the autonomous driving control unit 300 transmits, to the vehicle control unit 200, a driving force command value indicating a driving force of a driving unit (engine or motor), a brake command value indicating an operating state of the brake mechanism, and a steering angle command value indicating a steering angle of the wheel. The vehicle control unit 200 executes control of each control target mechanism according to the given command value.

In the present disclosure, "autonomous driving" means driving in which drive control, brake control, and steering angle control are all automatically executed without a driver performing a driving operation. Therefore, in autonomous driving, the operating state of the driving unit, the operating state of the brake mechanism, and the steering angle of the wheel are automatically determined. "Manual driving" means driving in which the driver operates an accelerator pedal to control the driving unit, operates a brake pedal to control the brake, and operates a steering wheel to control the steering angle.

The surrounding detection unit 400 uses in-vehicle sensors such as a camera 410 and a radar 420 to acquire information on various target objects such as objects and road equipment (lanes, intersections, traffic lights, and the like) that are present around the subject vehicle 10.

The support information acquisition unit 500 acquires various types of support information for autonomous driving. The support information acquisition unit 500 includes a GNSS receiver 510, a navigation device 520, and a wireless communication device 530. The GNSS receiver 510 measures the longitude and latitude of the current position of the subject vehicle 10 based on navigation signals received from artificial satellites that constitute a global navigation satellite system (GNSS). The navigation device 520 has a function of determining a planned route for autonomous driving based on the destination and the subject vehicle position detected by the GNSS receiver 510. The wireless communication device 530 acquires various pieces of information on a traveling road of the vehicle 10 by communicating with various external devices 700. For example, the wireless communication device 530 can perform vehicle-to-vehicle communication with other vehicles 710 or road-to-vehicle communication with a wireless roadside machine 720 installed in road equipment to acquire information on the status of the traveling road. The wireless roadside machine 720 is, for example, a wireless device that constitutes an intelligent transport system.

The four-wheel drive control unit 100 includes a region setting unit 110, a slip ratio calculation unit 120, a friction coefficient estimation unit 130, and a switching execution unit 140.

The region setting unit 110 sets a drive region including a two-wheel drive region and a four-wheel drive region. The two-wheel drive region is a region where the vehicle is switched from two-wheel drive to four-wheel drive according to the slip ratio of the wheel. The four-wheel drive region is a region in which four-wheel drive is executed regardless of the slip ratio.

Figure 3A:
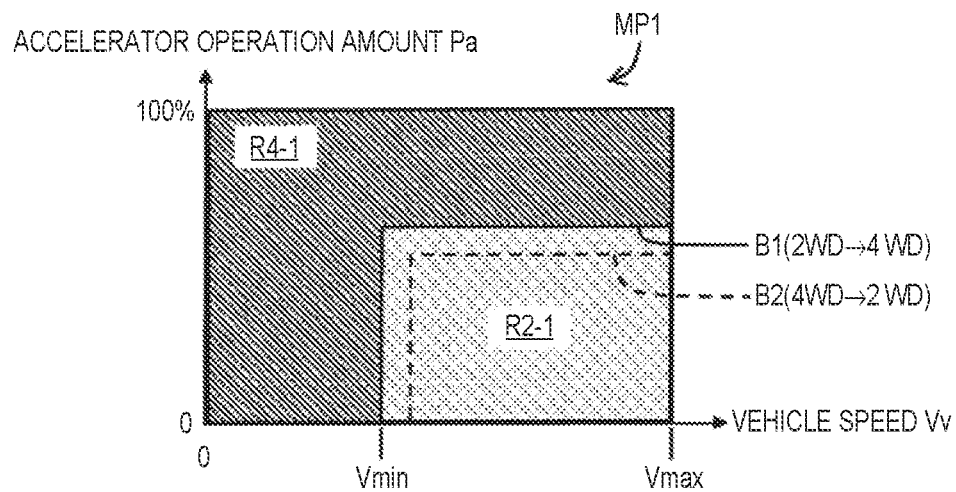
FIG. 3A is an explanatory diagram illustrating an example of a drive region for manual driving used in a first embodiment of the control device of the present disclosure.
Figure 3B:
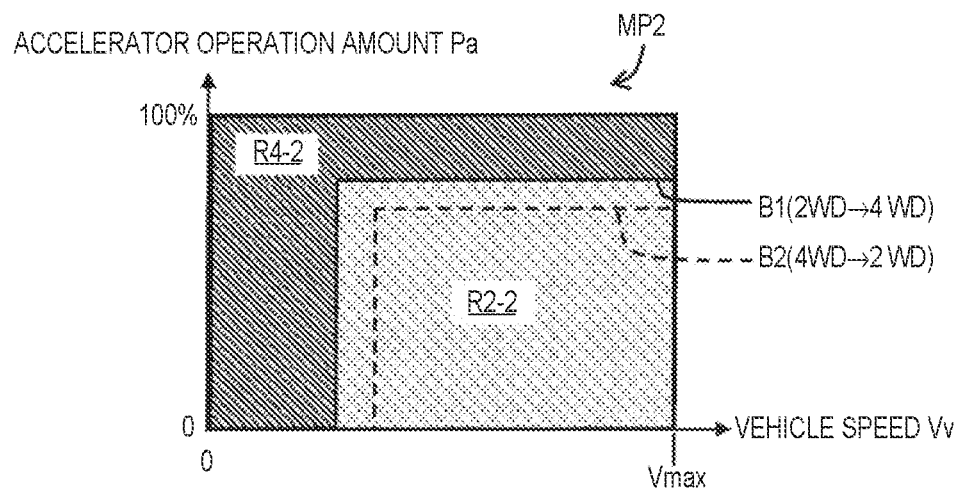
FIG. 3B is an explanatory diagram illustrating an example of a drive region for autonomous driving used in the first embodiment of the control device of the present disclosure.

FIGS. 3A and 3B are explanatory diagrams illustrating examples of drive regions. Here, a drive region MP1 for manual driving and a drive region MP2 for autonomous driving are illustrated. These drive regions MP1, MP2 are two-dimensional maps defined by a vehicle speed Vv and an accelerator operation amount Pa. The vehicle speed Vv is a value detected by the vehicle speed sensor 610, and the accelerator operation amount Pa is a value indicating the amount of depression of the accelerator pedal detected by an accelerator operation amount sensor 630.

The drive region MP1 for manual driving is divided into a two-wheel drive region R2-1 and a four-wheel drive region R4-1. When the vehicle 10 is traveling in the two-wheel drive region R2-1, if a first switching condition set in advance is satisfied, the two-wheel drive is switched to the four-wheel drive. On the other hand, when the vehicle 10 is traveling in the four-wheel drive region R4-1, if a second switching condition set in advance is satisfied, the four-wheel drive is switched to the two-wheel drive. The first and second switching conditions will be described below.

The two-wheel drive region R2-1 is a region extending between a region lower limit speed Vmin and a region upper limit speed Vmax. The region lower limit speed Vmin is set to a value greater than zero. Also, in the example of FIG. 3A, the accelerator operation amount Pa at the upper end of the two-wheel drive region R2-1 is set to a value less than 100%.

The four-wheel drive region R4-1 is provided outside the two-wheel drive region R2-1. The four-wheel drive region R4-1 is a region where a combination of the vehicle speed Vv and the accelerator operation amount Pa is likely to cause wheel slip. In the four-wheel drive region R4-1, four-wheel drive is applied regardless of whether slip actually occurs. In this way, the possibility of slippage can be reduced, and stable traveling with high traction performance can be achieved.

As boundary lines between the two-wheel drive region R2-1 and the four-wheel drive region R4-1, a first boundary line B1 when switching from two-wheel drive to four-wheel drive and a second boundary line B2 when switching from four-wheel drive to two-wheel drive are set. The second boundary line B2 is set inside the first boundary line B1. This is because providing hysteresis prevents the occurrence of an unstable state in which two-wheel drive and four-wheel drive are frequently switched. In the present disclosure, the size of the two-wheel drive region R2-1 is defined by the first boundary line B1 when switching from two-wheel drive to four-wheel drive.

The drive region MP2 for autonomous driving is similarly divided into a two-wheel drive region R2-2 and a four-wheel drive region R4-2. This two-wheel drive region R2-2 is expanded more than the two-wheel drive region R2-1 of the drive region MP1 for manual driving. On the other hand, the four-wheel drive region R4-2 is smaller than the four-wheel drive region R4-1 of the drive region MP1 for manual driving. In this way, when the two-wheel drive region is expanded during autonomous driving, it is possible ensure the traction performance of the four-wheel drive while suppressing the deterioration in fuel efficiency.

The drive regions MP1, MP2 may be created using driving state parameters other than the vehicle speed Vv and the accelerator operation amount Pa. As other driving state parameters, for example, the acceleration of the vehicle and the connected/disconnected state (disconnection ratio) of the dog clutch can be used. Generally, a drive region that distinguishes between the two-wheel drive region and the four-wheel drive region can be set in a driving state space defined by one or more driving state parameters. That is, the drive region that distinguishes the two-wheel drive region and the four-wheel drive region is set according to the driving state parameters.

Figure 4:
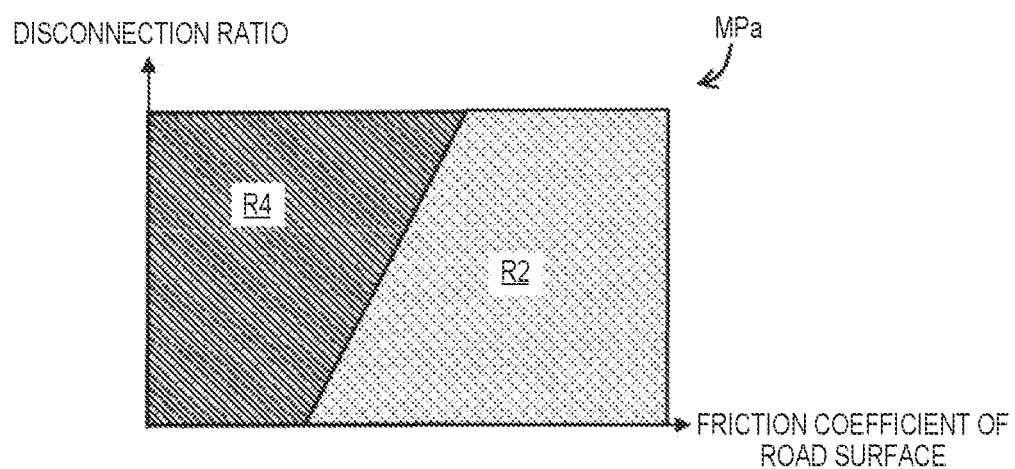
FIG. 4 is an explanatory diagram illustrating another example of the drive region.
Figure 4:
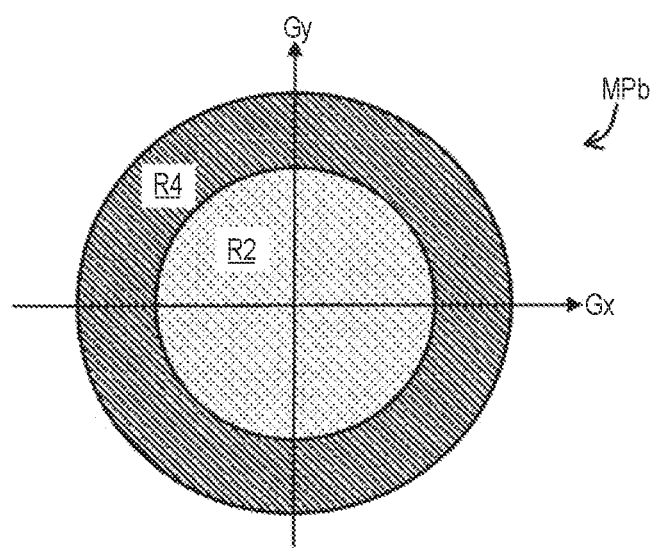

FIG. 4 is an explanatory diagram illustrating another example of the drive region. The horizontal axis of a drive region MPa illustrated in the upper part of FIG. 4 is a friction coefficient between a road surface of the traveling road and the wheel, and the vertical axis is a connected/disconnected state (disconnection ratio) of the dog clutch. The friction coefficient between the road surface of the traveling road and the wheel is also simply referred to as a "friction coefficient of the traveling road" or a "friction coefficient of the road surface". In this drive region MPa, a region with a large friction coefficient is set as a two-wheel drive region R2, and a region with a small friction coefficient is set as a four-wheel drive region R4. Further, the higher the disconnection ratio of the dog clutch, the wider the width of the four-wheel drive region R4 is set. The horizontal axis of the drive region MPb illustrated in the lower part of FIG. 4 is a lateral acceleration Gx of the vehicle, and the vertical axis is a forward acceleration Gy of the vehicle. In this drive region MPb, a circular region with a small acceleration is set as a two-wheel drive region R2, and a ring-shaped region with a large acceleration is set as a four-wheel drive region R4. Even when using either of these drive regions MPa or MPb, it is preferable to expand the two-wheel drive region during autonomous driving compared to during manual driving. In the first embodiment, the drive regions MP1, MP2 described in FIGS. 3A and 3B are used.

A first switching condition from two-wheel drive to four-wheel drive can be considered to be satisfied, for example, when at least one of the following conditions C1$a$ to C1$c$ is satisfied.

First Switching Condition C1

(C1$a$) The coordinate position on the drive region determined by the current value of the driving state parameter has moved from the inside to the outside of the first boundary line B1 between the two-wheel drive region and the four-wheel drive region.
(C1$b$) The slip ratio of the wheel has become equal to or greater than a first slip ratio threshold Ts1 set in advance.
(C1$c$) The friction coefficient of the road surface has become less than a first friction coefficient threshold Tµ1 set in advance.

An example of the switching operation from two-wheel drive to four-wheel drive will be described below.

A second switching condition from four-wheel drive to two-wheel drive is considered to be satisfied, for example, when all of the following conditions C2$a$ to C2$c$ are satisfied.

Second Switching Condition C2

(C2$a$) The coordinate position on the drive region determined by the current value of the driving state parameter has moved from the outside to the inside of the second boundary line B2 between the two-wheel drive region and the four-wheel drive region.
(C2$b$) The slip ratio of the wheel has become less than a second slip ratio threshold Ts2 set to a value smaller than the first slip ratio threshold Ts1.
(C2$c$) The friction coefficient of the road surface has become equal to or greater than a second friction coefficient threshold Tµ2, which is set to a larger value than the first friction coefficient threshold Tµ1.

Any one or two of the conditions C1$a$ to C1$c$ described above may be used as the first switching condition C1. Moreover, conditions other than these may be used as the first switching condition C1. The second switching condition C2 is appropriately set according to the first switching condition C1. The various thresholds may be set to different values in the case of manual driving and in the case of autonomous driving, or may be set to the same value. Further, when using the above-described switching conditions C1, C2, it is preferable to use parameters other than the slip ratio of the wheel and the friction coefficient of the road surface as the driving state parameter that defines the drive region.

The slip ratio calculation unit 120 uses the vehicle speed Vv (vehicle body speed) measured by the vehicle speed sensor 610 and a wheel speed Vw of each wheel measured by a wheel speed sensor 620 to calculate a slip ratio Sr of the wheel according to the following equation (1):

$$Sr = \max|Vv - Vw|/Vv \qquad (1)$$

Here, max means the calculation that takes the maximum value of the slip ratios for the four wheels. The slip ratio may be calculated using any one of the wheel speeds Vw of the four wheels instead of the vehicle speed Vv.

The friction coefficient estimation unit 130 estimates the friction coefficient of the road surface of the traveling road on which the vehicle 10 is currently traveling. For a method of estimating the friction coefficient, a method using a history of the slip ratios may be used. This method will be described below. Alternatively, road surface information obtained through communication with the external device 700 such as another vehicle 710 or the wireless roadside machine 720 may be used to estimate the friction coefficient of the road surface. Further, the friction coefficient of the road surface may be estimated using the road surface information obtained from the image taken by the camera 410 mounted on the vehicle 10. Further, the friction coefficient of the road surface may be estimated using one or more of these pieces of information. In this way, by using various types of information, the friction coefficient of the road surface can be estimated with high accuracy.

Figure 5:
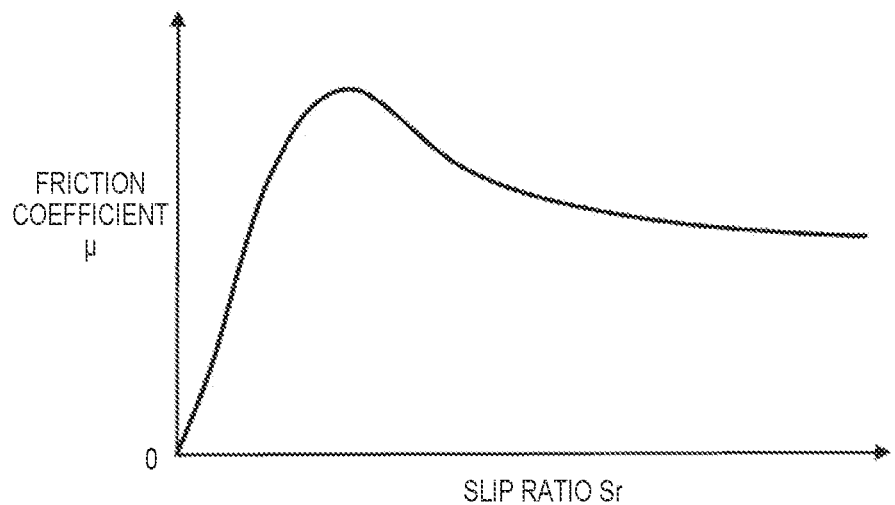
FIG. 5 is a graph illustrating a method that estimates a friction coefficient between a road and a wheel from a history of a slip ratio of the wheel of the vehicle.

FIG. 5 is a graph illustrating a method of estimating the friction coefficient of the road surface from the history of the slip ratio of the wheel. The horizontal axis of FIG. 5 is the slip ratio Sr, and the vertical axis is the friction coefficient $\mu$ of the road surface. Since the slip ratio Sr changes while the vehicle is traveling, the friction coefficient $\mu$ at a current time can be estimated from the history of the slip ratio Sr using the graph in FIG. 5. However, in reality, the value of the friction coefficient $\mu$ cannot be uniquely estimated according to the value of the slip ratio Sr, and the estimated value of the friction coefficient $\mu$ changes depending on other driving state parameters such as vehicle acceleration. Therefore, the friction coefficient estimation unit 130 can estimate the friction coefficient $\mu$ using the history of the slip ratio Sr and also by taking other driving state parameters into account.

The switching execution unit 140 executes switching between two-wheel drive and four-wheel drive according to the switching conditions C1, C2 described above using one or more of the drive region set by the region setting unit 110, the slip ratio calculated by the slip ratio calculation unit 120, and the friction coefficient estimated by the friction coefficient estimation unit 130.

Figure 6:
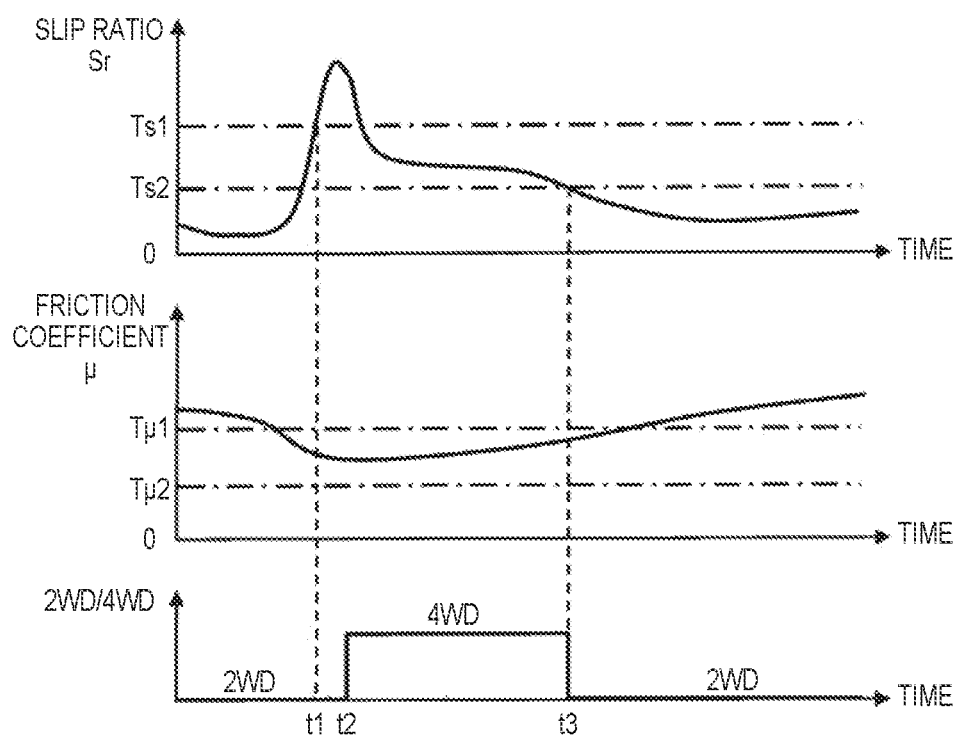
FIG. 6 is a timing chart illustrating an example of an operation in which the vehicle is switched from two-wheel drive to four-wheel drive according to the slip ratio of the wheel.

FIG. 6 is a timing chart illustrating an example of the operation of switching from two-wheel drive to four-wheel drive according to the slip ratio Sr when the vehicle 10 is in a state of autonomous driving. As the thresholds for the slip ratio Sr, the first slip ratio threshold Ts1 used in the first switching condition C1, and the second slip ratio threshold Ts2 used in the second switching condition C2 are shown. As the thresholds of the friction coefficient $\mu$, the first friction coefficient threshold value T$\mu$1 used in the first switching condition C1 and a second friction coefficient threshold value T$\mu$2 used in the second switching condition C2 are shown.

In FIG. 6, the vehicle is traveling in two-wheel drive before time t1. When the slip ratio Sr becomes equal to or greater than the first slip ratio threshold Ts1 at time t1, the switching execution unit 140 responds by making a determination to change from two-wheel drive to four-wheel drive, and the drive system is switched to four-wheel drive at time t2 thereafter. That is, at time t2, the two disconnect mechanisms 18, 42 are respectively changed from the disconnected state to the connected state. The reason why there is a time delay between the switching decision time t1 and the execution time t2 is because the disconnect mechanisms 18, 42 synchronize the rotations of the shafts to be connected to each other before connection to reduce the shock at the time of connection. Then, when the slip ratio Sr becomes less than the second slip ratio threshold Ts2 at time t3, the switching execution unit 140 responds by switching the drive system from four-wheel drive to two-wheel drive. When switching from four-wheel drive to two-wheel drive, there is no need to provide a time delay between the switching decision time and the execution time. In the example of FIG. 6, since the friction coefficient $\mu$ of the traveling road is equal to or greater than the first friction coefficient threshold T$\mu$1 in the first switching condition C1, the friction coefficient $\mu$ is not used in determining whether to switch the drive state.

Figure 7:
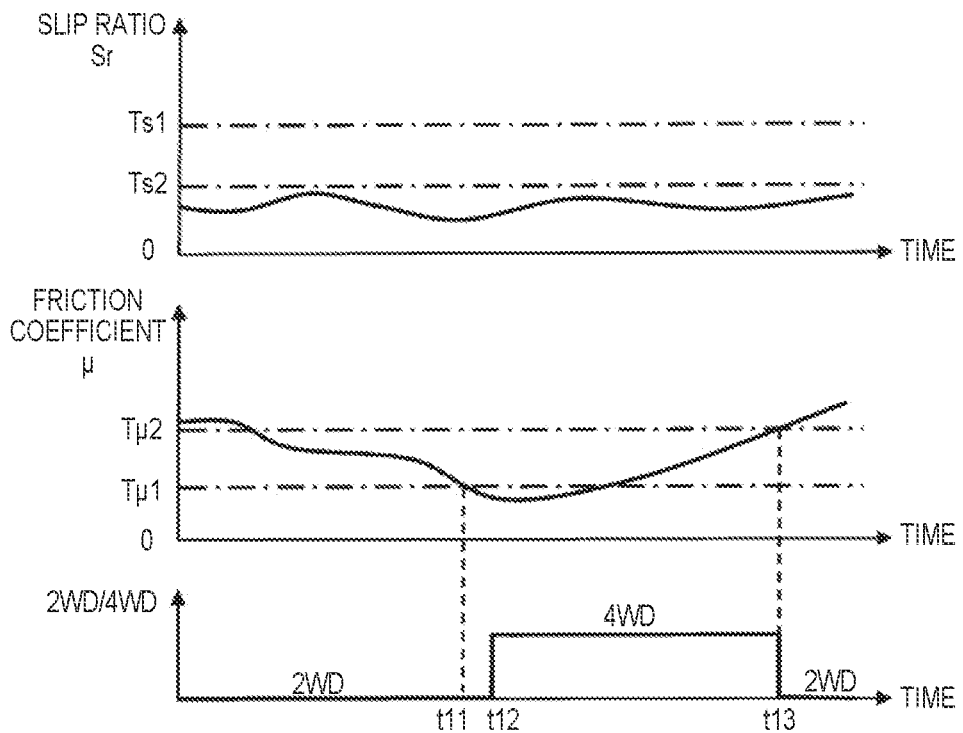
FIG. 7 is a timing chart illustrating an example of operation in which the vehicle is switched from two-wheel drive to four-wheel drive according to the friction coefficient of the road.

FIG. 7 is a timing chart illustrating an example of an operation in which two-wheel drive is switched to four-wheel drive according to the friction coefficient $\mu$ of the road surface when the vehicle 10 is in a state of autonomous driving. In this example, the slip ratio Sr is less than the first slip ratio threshold Ts1. When the friction coefficient $\mu$ becomes less than the first friction coefficient threshold T$\mu$1 at time t11, the switching execution unit 140 determines that two-wheel drive should be changed to four-wheel drive in response, and the drive system is then switched to four-wheel drive at time t12. Thereafter, when the friction coefficient $\mu$ becomes equal to or greater than the second friction coefficient threshold T$\mu$2 at time t13, the switching execution unit 140 responds by switching the drive system from four-wheel drive to two-wheel drive. In this way, when it is determined that the friction coefficient $\mu$ is less than the first friction coefficient threshold T$\mu$1, four-wheel drive may be performed regardless of the value of the slip ratio Sr. This makes it possible to suppress the occurrence of slips when the friction coefficient $\mu$ of the road surface is small.

Figure 8:
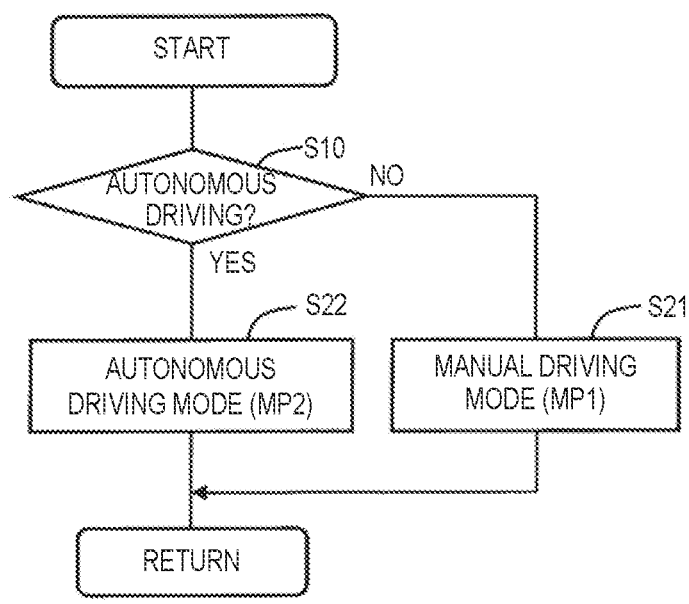
FIG. 8 is a flowchart illustrating a procedure that selects a drive control mode in the first embodiment.

FIG. 8 is a flowchart illustrating a procedure that selects a drive control mode in the first embodiment. The process in FIG. 8 is repeatedly executed at regular intervals. In step S10, the region setting unit 110 determines whether the vehicle 10 is in autonomous driving. This determination can be executed in response to a driving status signal provided from the autonomous driving control unit 300 to the four-wheel drive control unit 100.

When the vehicle 10 is in a state of manual driving, the process proceeds to step S21, and the region setting unit 110 selects a manual driving mode as the drive control mode. The manual driving mode is a mode using the drive region MP1 for manual driving illustrated in FIG. 3A. The switching execution unit 140 uses the selected drive region MP1 to execute switching between two-wheel drive and four-wheel drive according to the switching conditions C1, C2 described above.

When the vehicle 10 is in a state of autonomous driving, the process proceeds to step S22, and the region setting unit 110 selects an autonomous driving mode as the drive control mode. The autonomous driving mode is a mode using the drive region MP2 for autonomous driving illustrated in FIG. 3B. The switching execution unit 140 uses the selected drive region MP2 to execute switching between two-wheel drive and four-wheel drive according to the switching conditions C1, C2 described above.

As described above, in the first embodiment, the two-wheel drive region is expanded during autonomous driving compared to manual driving, so traction performance by four-wheel drive can be ensured while suppressing the deterioration in fuel efficiency.

Figure 9:
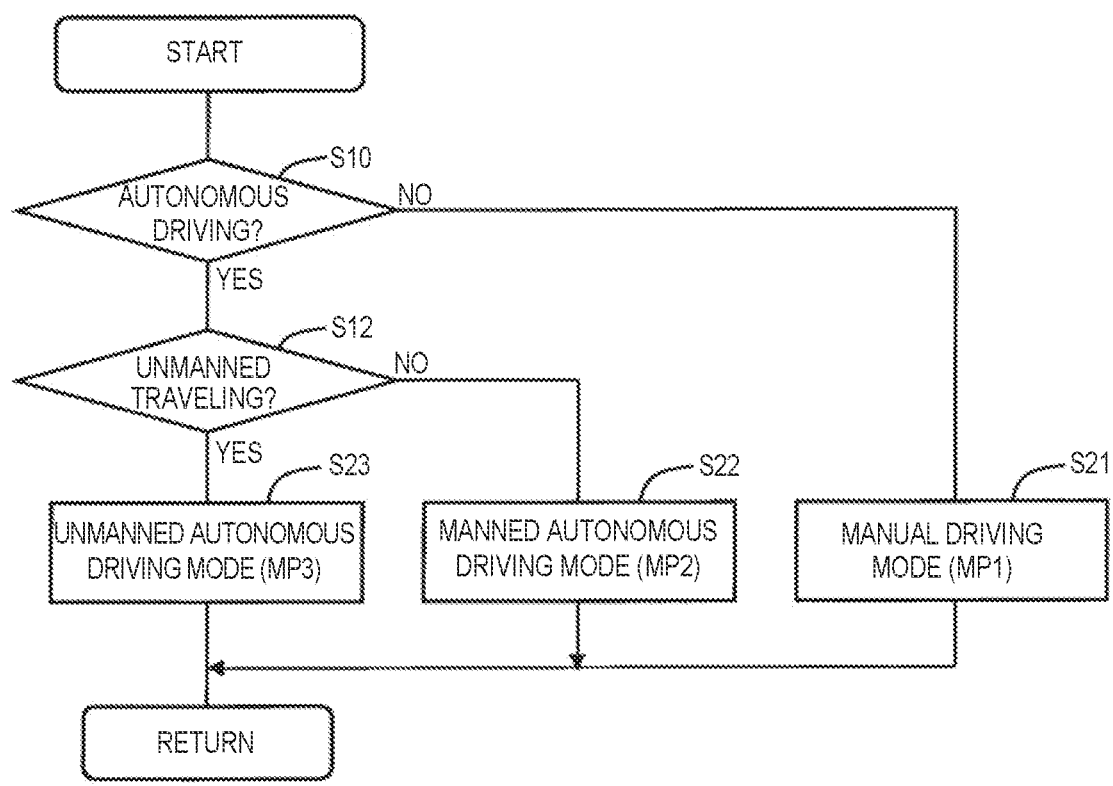
FIG. 9 is a flowchart illustrating a procedure that selects a drive control mode in a second embodiment of the control device of the present disclosure.
Figure 10A:
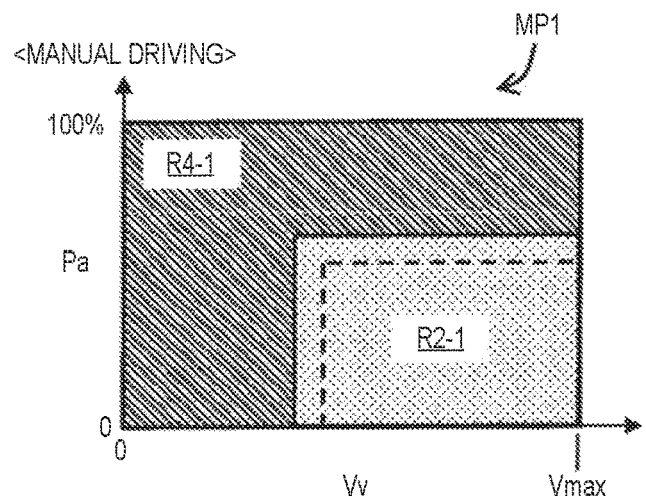
FIG. 10A is an explanatory diagram illustrating an example of a drive region for manual driving used in the second embodiment.
Figure 10B:
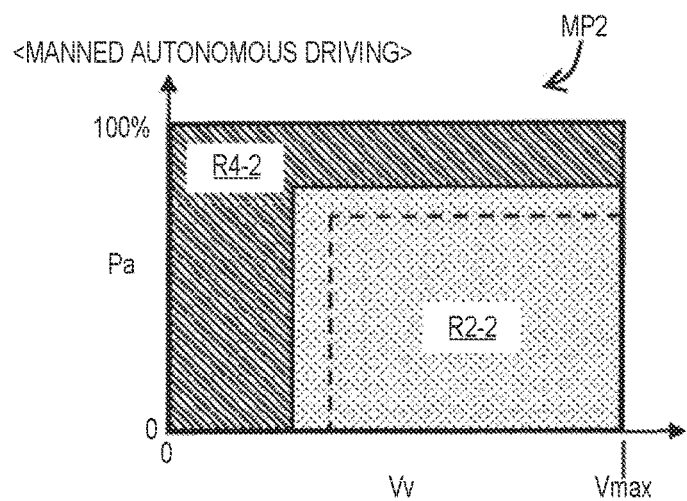
FIG. 10B is an explanatory diagram illustrating an example of a drive region for manned autonomous driving used in the second embodiment.
Figure 10C:
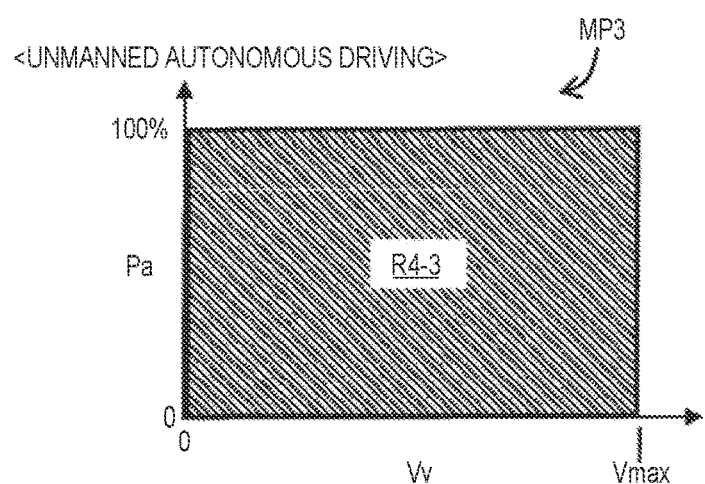
FIG. 10C is an explanatory diagram illustrating an example of a drive region for unmanned autonomous driving used in the second embodiment.

Next, a second embodiment of the present disclosure will be described below. FIG. 9 is a flowchart illustrating a procedure that selects a drive control mode in the second embodiment, and FIGS. 10A, 10B, and 10C are explanatory diagrams illustrating examples of drive regions used in the second embodiment. The procedure of FIG. 9 is the procedure of FIG. 8 in the first embodiment with steps S12, S23 added, and the contents of steps S10, S21, S22 are almost the same as the contents of steps S10, S21, S22 of FIG. 8. Also, the configuration of the vehicle 10 and the switching conditions C1, C2 of the drive state are the same as in the first embodiment.

When the vehicle 10 is in the state of manual driving, the process proceeds to step S21, and the region setting unit 110 selects the manual driving mode as the drive control mode. The manual driving mode is a mode using the drive region MP1 for manual driving illustrated in FIG. 10A. This drive region MP1 is the same as the drive region MP1 illustrated in FIG. 3A. However, a drive region different from the drive region MP1 in FIG. 3A may be used.

When the vehicle 10 is in autonomous driving, the process proceeds to step S12, and the region setting unit 110 determines whether the vehicle 10 is traveling unmanned, that is, whether one or more people are on board. This determination can be performed in response to a boarding status signal provided by an occupant sensor 640 to the four-wheel drive control unit 100.

When the vehicle 10 is in autonomous driving and manned traveling, in step S22, the region setting unit 110 selects a manned autonomous driving mode as the drive control mode. The manned autonomous driving mode is a mode using the drive region MP2 in FIG. 10B. This drive region MP2 is the same as the drive region MP2 illustrated in FIG. 3B. However, a drive region different from the drive region MP2 in FIG. 3B may be used.

When the vehicle 10 is in autonomous driving and unmanned traveling, in step S23, the region setting unit 110 selects an unmanned autonomous driving mode as the drive control mode. The unmanned autonomous driving mode is a mode that uses a drive region MP3 in FIG. 10C. The drive region MP3 has no two-wheel drive region and is all four-wheel drive region R4-3. In other words, the unmanned autonomous driving mode is a mode in which four-wheel drive is always executed. However, other drive control modes, such as a mode in which two-wheel drive is always executed, may be used as the unmanned autonomous driving mode.

The second embodiment also has the same effect as the first embodiment. Further, in the second embodiment, one of a plurality of different drive regions is selected and used depending on selection conditions including whether the vehicle 10 is traveling unmanned, resulting in it being possible for drive control to be executed according to each of the appropriate drive regions depending on whether the vehicle 10 is traveling unmanned.

Figure 11:
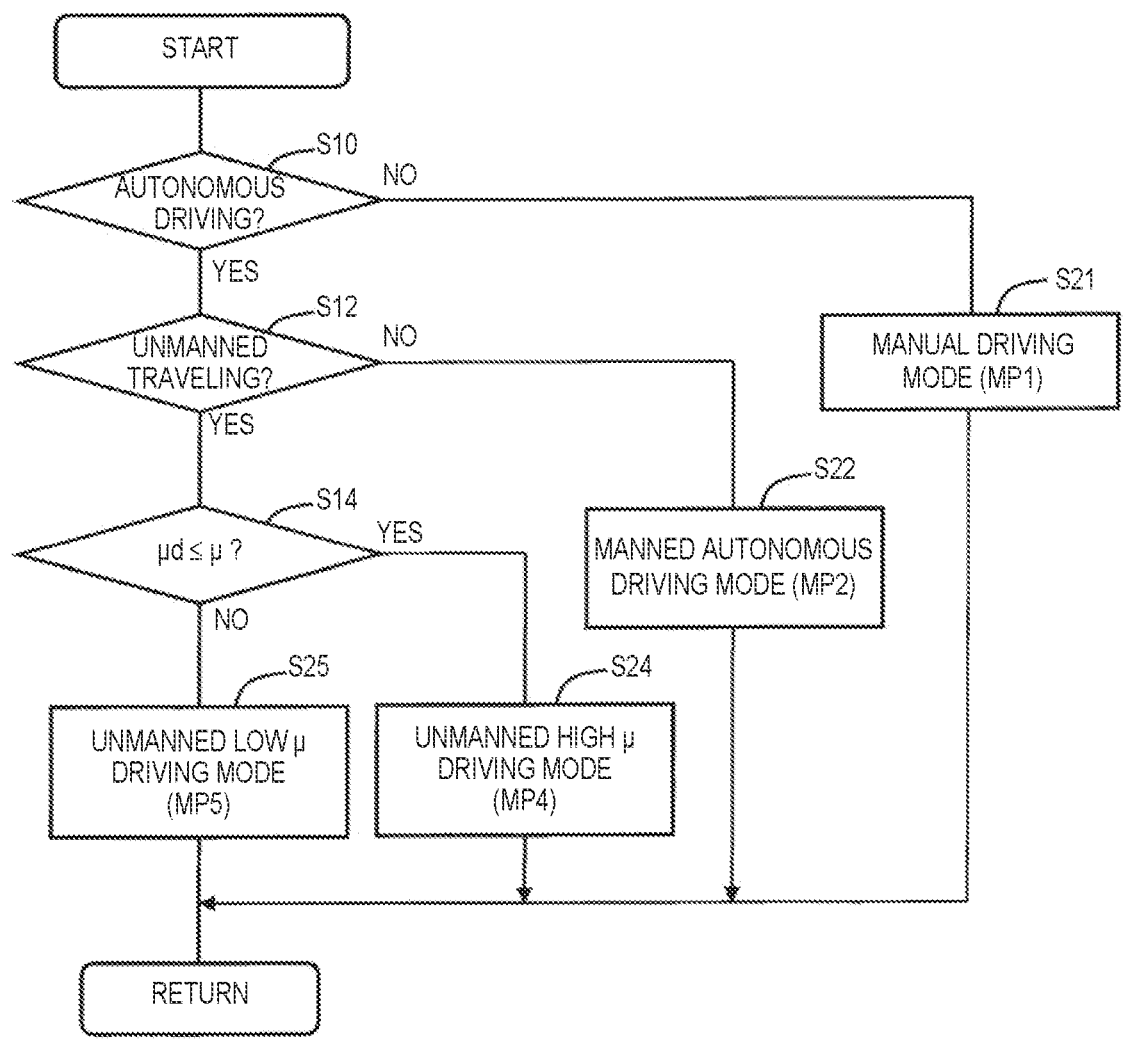
FIG. 11 is a flowchart illustrating a procedure that selects a drive control mode in a third embodiment of the control device of the present disclosure.
Figure 12A:
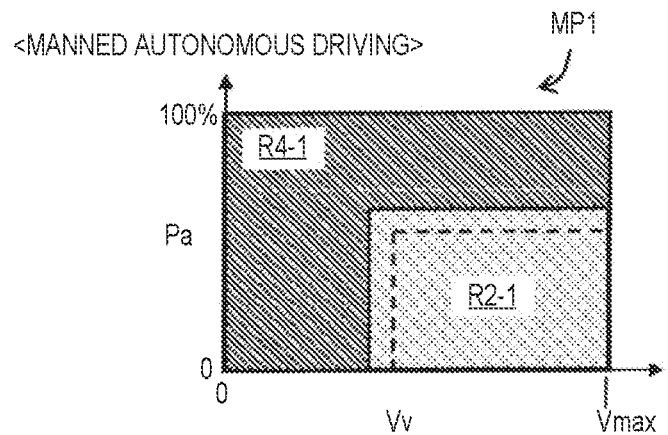
FIG. 12A is an explanatory diagram illustrating an example of a drive region for manual driving used in the third embodiment.
Figure 12B:
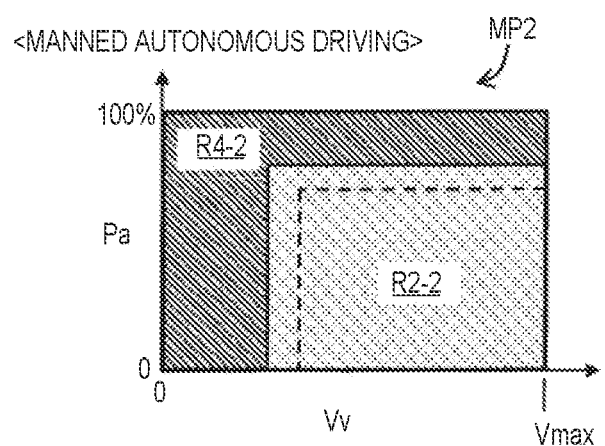
FIG. 12B is an explanatory diagram illustrating an example of a drive region for manned autonomous driving used in the third embodiment.
Figure 12D:
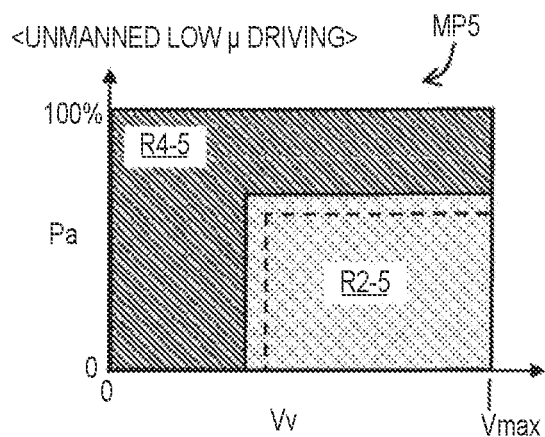
FIG. 12D is an explanatory diagram illustrating an example of a drive region for unmanned low u driving used in the third embodiment.
Figure 12C:
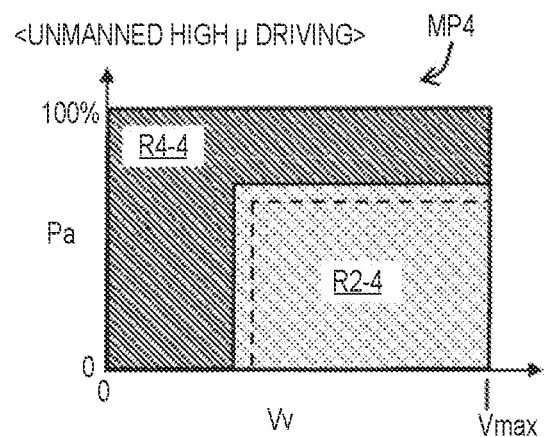
FIG. 12C is an explanatory diagram illustrating an example of a drive region for unmanned high u driving used in the third embodiment.

A third embodiment of the present disclosure will be described below. FIG. 11 is a flowchart illustrating a procedure that selects a drive control mode in the third embodiment, and FIGS. 12A, 12B, 12C, and 12D are explanatory diagrams illustrating examples of drive regions used in the third embodiment. The procedure in FIG. 11 is the procedure in FIG. 8 in the first embodiment with steps S12, S14, S24, and S25 added, and the content of steps S10, S21, S22 is substantially the same as the content of steps S10, S21, S22 in FIG. 8. Also, the configuration of the vehicle 10 and the switching conditions C1, C2 of the drive state are the same as in the first embodiment.

When the vehicle 10 is in a state of manual driving, the process proceeds to step S21, and the region setting unit 110 selects a manual driving mode as the drive control mode. The manual driving mode is a mode using the drive region MP1 for manual driving illustrated in FIG. 12A. This drive region MP1 is the same as the drive region MP1 illustrated in FIG. 3A. However, a drive region different from the drive region MP1 in FIG. 3A may be used.

When the vehicle 10 is in a state of autonomous driving, the process proceeds to step S12, and the region setting unit 110 determines whether the vehicle 10 is traveling unmanned, that is, whether one or more people are on board. This determination can be performed in response to a boarding status signal provided from the occupant sensor 640 to the four-wheel drive control unit 100.

When the vehicle 10 is in a state of autonomous driving and manned traveling, in step S22, the region setting unit 110 selects a manned autonomous driving mode as the drive control mode. The manned autonomous driving mode is a mode that uses the drive region MP2 in FIG. 12B. This drive region MP2 is the same as the drive region MP2 illustrated in FIG. 3B. However, a drive region different from the drive region MP2 in FIG. 3B may be used.

When the vehicle 10 is in a state of autonomous driving and unmanned traveling, the process proceeds to step S14, and the region setting unit 110 determines whether the friction coefficient μ of the road surface is equal to or less than a determination value μd set in advance. The determination value μd is preferably set to a value larger than the friction coefficient thresholds Tμ1, Tμ2 used in the switching conditions C1, C2 described in the first embodiment.

When the friction coefficient μ is equal to or greater than the determination value μd set in advance, the process proceeds to step S24, and the region setting unit 110 selects an unmanned high μ driving mode as the drive control mode. The unmanned high μ driving mode is a mode using a drive region MP4 in FIG. 12C. This drive region MP4 has a two-wheel drive region R2-4 smaller and a four-wheel drive region R4-4 larger than those of the drive region MP2 used in the manned autonomous driving mode.

When the friction coefficient μ is less than the determination value μd, the process proceeds to step S25, and the region setting unit 110 selects the unmanned low u driving mode as the drive control mode. The unmanned low u driving mode is a mode using a drive region MP5 in FIG. 12D. This drive region MP5 has a two-wheel drive region R2-5 further smaller and a four-wheel drive region R4-5 further larger than those of the drive region MP4 used in the unmanned high μ driving mode. In this way, when the four-wheel drive region with the friction coefficient μ less than the determination value μd is extended beyond the four-wheel drive region with the friction coefficient μ greater than or equal to the determination value μd, the possibility of the wheel slipping can be reduced, and thus high traction performance can be ensured.

It is preferable that each of the drive region MP4 used in the unmanned high μ driving mode and the drive region MP5 used in the unmanned low u driving mode have the two-wheel drive region R2 expanded more than that of the drive region MP1 used in the manual driving mode. In this way, the drive regions MP2, MP4, MP5 for autonomous driving each have the two-wheel drive region R2 expanded more than that of the drive region MP1 for manual driving, thus making it possible to ensure traction performance with four-wheel drive while suppressing the deterioration in fuel efficiency during autonomous driving.

The third embodiment also has the same effect as the first embodiment. Also, in the third embodiment, as in the second embodiment, any one of the plurality of drive regions is selected depending on selection conditions including whether the vehicle 10 is traveling unmanned, resulting in it being possible for drive control to be executed according to each of the appropriate drive region depending on whether the vehicle 10 is traveling unmanned.

Figure 13:
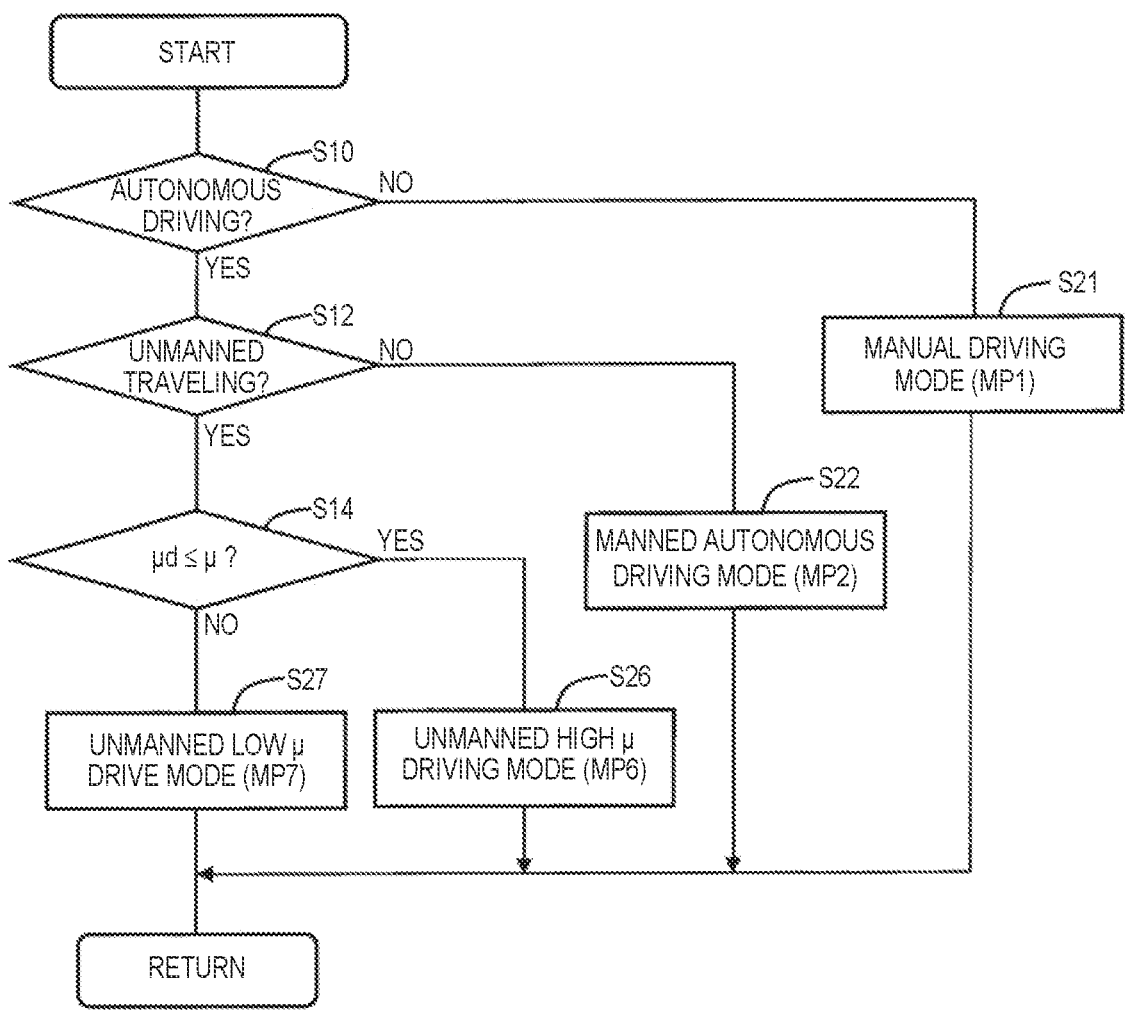
FIG. 13 is a flowchart illustrating a procedure that selects a drive control mode in a fourth embodiment of the control device of the present disclosure.

Next, a fourth embodiment of the present disclosure will be described below. FIG. 13 is a flowchart illustrating a procedure that selects a drive control mode in the fourth embodiment, and FIGS. 14A, 14B, 14C, 14D are explanatory diagrams illustrating examples of drive regions used in the fourth embodiment. The procedure in FIG. 13 is obtained by replacing steps S24, S25 of the procedure in FIG. 11 in the third embodiment with steps S26, S27, and the content of the other steps is almost the same as in FIG. 11. Also, the configuration of the vehicle 10 and the switching conditions C1, C2 of the drive state are the same as in the first embodiment.

Figure 14A:
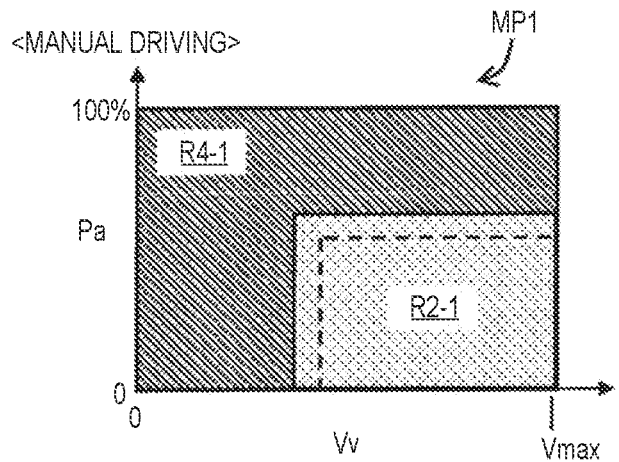
FIG. 14A is an explanatory diagram illustrating an example of a drive region for manual driving used in the fourth embodiment.
Figure 14B:
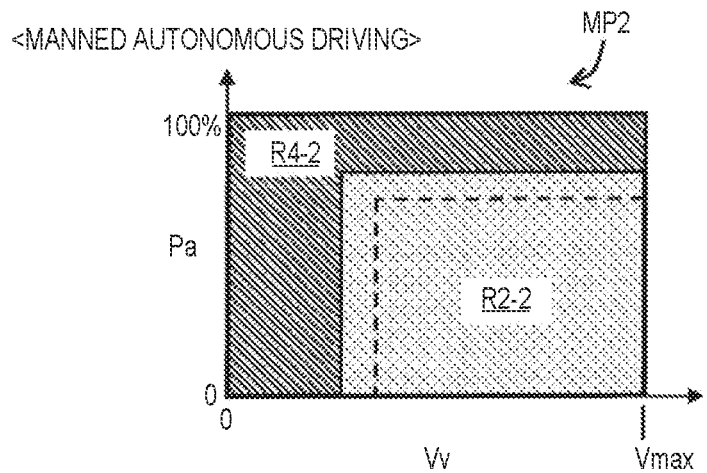
FIG. 14B is an explanatory diagram illustrating an example of a drive region for manned autonomous driving used in the fourth embodiment.
Figure 14D:
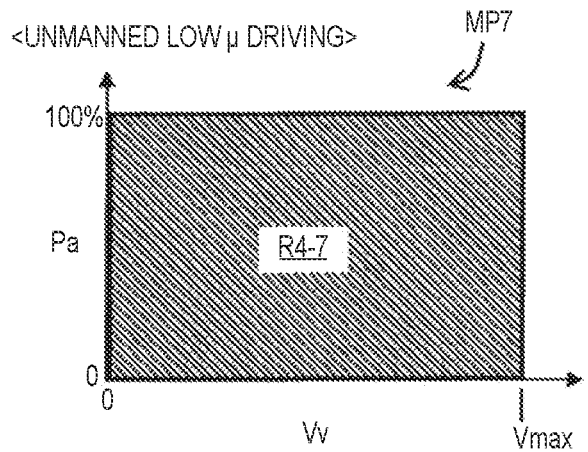
FIG. 14D is an explanatory diagram illustrating an example of a drive region for unmanned low u driving used in the fourth embodiment.
Figure 14C:
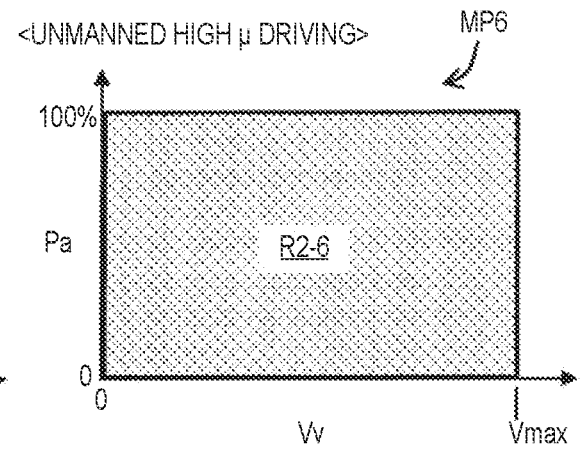
FIG. 14C is an explanatory diagram illustrating an example of a drive region for unmanned high u driving used in the fourth embodiment.

When the vehicle 10 is in a state of autonomous driving and unmanned traveling, and the friction coefficient μ of the road surface is equal to or greater than the determination value μd set in advance, the process proceeds to step S26, and an unmanned high μ driving mode is selected as the drive control mode. In the unmanned high μ driving mode of the fourth embodiment, a drive region MP6 in FIG. 14C is used. In this drive region MP6, no four-wheel drive region is set, and all are two-wheel drive regions R2-6. However, when the first switching condition C1 described in the first embodiment is satisfied, the two-wheel drive is switched to the four-wheel drive.

When the vehicle 10 is in a state of autonomous driving and unmanned traveling mode, and the friction coefficient μ of the road surface is less than the determination value μd, the process proceeds to step S27, and an unmanned low u driving mode is selected as the drive control mode. In the unmanned low u driving mode of the fourth embodiment, a drive region MP7 in FIG. 14D is used. In this drive region MP7, no two-wheel drive region is set, and all are four-wheel drive regions R4-7.

As can be understood from the above-described FIGS. 3A, 3B, 10A, 10B, 10C, 12A, 12B, 12C, 12D, 14A, 14B, 14C, 14D, for all the drive regions for autonomous driving, it is not necessary for the two-wheel drive region R2 to be expanded more than that of the drive region MP1 for manual driving, but rather it is sufficient that the two-wheel drive region R2 is expanded for at least one drive region for autonomous driving. In the present disclosure, the phrase "expand the two-wheel drive region during autonomous driving compared to during manual driving" is used in a broad sense including such cases.

The present disclosure is not limited to the embodiments described above, and can be realized in various forms without departing from the spirit thereof. For example, the present disclosure can also be realized in the following aspects. The technical features in the above-described embodiments that correspond to the technical features in each form described below can be replaced or combined as appropriate to solve some or all of the problems of the present disclosure, or to achieve some or all of the effects of the present disclosure. Further, unless the technical feature is described as essential in this specification, it can be deleted as appropriate.

What is claimed is:

1. A control device configured to control a vehicle that is designed for autonomous driving and is able to switch between two-wheel drive and four-wheel drive, the control device comprising:
a region setting unit configured to set a drive region including a two-wheel drive region in which the two-wheel drive is executed and a four-wheel drive region in which the four-wheel drive is executed according to a driving state parameter; and
a switching execution unit configured to switch between the two-wheel drive and the four-wheel drive according to a switching condition set in advance while the vehicle is traveling in the two-wheel drive region, wherein
the region setting unit is configured to expand the two-wheel drive region during autonomous driving compared to manual driving.

2. The control device according to claim 1, further comprising a slip ratio calculation unit configured to calculate a slip ratio of a wheel of the vehicle, wherein the switching execution unit is configured to switch from the two-wheel drive to the four-wheel drive when the slip ratio becomes equal to or greater than a slip ratio threshold set in advance during execution of the two-wheel drive during autonomous driving.

3. The control device according to claim 2, wherein the slip ratio calculation unit is configured to calculate a slip ratio $S_r$ of the wheel from a vehicle speed $V_v$ and a wheel speed $V_w$ of each wheel of the vehicle using an equation $S_r = \max |V_v - V_w|/V_v$, where max means a calculation that takes a maximum value of the slip ratio for each wheel.

4. The control device according to claim 2, further comprising a friction coefficient estimation unit configured to estimate a friction coefficient between a traveling road of the vehicle and the wheel, wherein
the switching execution unit is configured to switch from the two-wheel drive to the four-wheel drive regardless of the slip ratio when the friction coefficient becomes less than a friction coefficient threshold set in advance during execution of the two-wheel drive during autonomous driving.

5. The control device according to claim 4, wherein the friction coefficient estimation unit is configured to estimate the friction coefficient of the traveling road using one or more pieces of slip ratio information indicating the slip ratio, first road surface information obtained by communication with an external device, and second road surface information obtained from an image taken by a camera mounted on the vehicle.

6. A control method that controls a vehicle that is designed for autonomous driving and is able to switch between two-wheel drive and four-wheel drive, the control method comprising:
a first step of setting a drive region including a two-wheel drive region in which the two-wheel drive is executed and a four-wheel drive region in which the four-wheel drive is executed according to a driving state parameter; and
a second step of switching between the two-wheel drive and the four-wheel drive according to a switching condition set in advance while the vehicle is traveling in the two-wheel drive region, wherein
the first step includes a step of expanding the two-wheel drive region during autonomous driving compared to manual driving.

7. The control method of claim 6, further comprising a third step of calculating a slip ratio of a wheel of the vehicle, wherein the second step includes a step of switching from the two-wheel drive to the four-wheel drive when the slip ratio becomes equal to or greater than a slip ratio threshold set in advance during execution of the two-wheel drive during autonomous driving.

8. The control method according to claim 7, wherein in the third step, a slip ratio $S_r$ of the wheel is calculated from a vehicle speed Vv and a wheel speed Vw of each wheel of the vehicle using an equation $Sr=\max|Vv-Vw|/Vv$, where max means a calculation that takes a maximum value of the slip ratio for each wheel.

9. The control method according to claim 7, further comprising a fourth step of estimating a friction coefficient between a traveling road of the vehicle and the wheel, wherein
the second step includes a step of switching from the two-wheel drive to the four-wheel drive regardless of the slip ratio when the friction coefficient becomes less than a friction coefficient threshold set in advance during execution of the two-wheel drive during autonomous driving.

10. The control method according to claim 9, wherein the fourth step includes a step of estimating the friction coefficient of the traveling road using one or more pieces of slip ratio information indicating the slip ratio, first road surface information obtained by communication with an external device, and second road surface information obtained from an image taken by a camera mounted on the vehicle.

\* \* \* \* \*